United States Patent
Endo et al.

(10) Patent No.: US 10,224,788 B2
(45) Date of Patent: Mar. 5, 2019

(54) MOTOR, ROTATION PERIOD DETECTION METHOD THEREOF, MOTOR ROTATION PERIOD DETECTION SENSOR ASSEMBLY, AND POWER GENERATOR

(71) Applicant: TOYO DENSO KABUSHIKI KAISHA, Minato-ku (JP)

(72) Inventors: Takehiko Endo, Sakado (JP); Junichi Takahashi, Hiki-gun (JP)

(73) Assignee: TOYO DENSO KABUSHIKI KAISHA, Tokyo (JP)

( * ) Notice: Subject to any disclaimer, the term of this patent is extended or adjusted under 35 U.S.C. 154(b) by 147 days.

(21) Appl. No.: 15/205,870

(22) Filed: Jul. 8, 2016

(65) Prior Publication Data
US 2017/0025931 A1    Jan. 26, 2017

(30) Foreign Application Priority Data

Jul. 23, 2015  (JP) .................................. 2015-145722

(51) Int. Cl.
*H02K 11/215*   (2016.01)
*H02K 29/08*    (2006.01)
(Continued)

(52) U.S. Cl.
CPC ........... *H02K 11/215* (2016.01); *G01D 5/145* (2013.01); *H02K 1/2786* (2013.01); *H02K 16/04* (2013.01);
(Continued)

(58) Field of Classification Search
CPC ..................................................... G01R 33/07
(Continued)

(56) References Cited

U.S. PATENT DOCUMENTS

| 5,610,457 A | 3/1997 | Kurita |
| 2004/0207280 A1* | 10/2004 | Luo .................. H02K 1/278 |
| | | 310/156.47 |

(Continued)

FOREIGN PATENT DOCUMENTS

| EP | 1 906 007 | 9/2007 |
| JP | 3299435 | 7/2002 |

(Continued)

OTHER PUBLICATIONS

WO2012169156, Translation, Dec. 13, 2012.*
Search Report dated Dec. 9, 2016 which issued in the corresponding European Patent Application No. 16179386.4.

*Primary Examiner* — Jay Patidar
(74) *Attorney, Agent, or Firm* — Cozen O'Connor

(57) ABSTRACT

A motor which is capable of realizing further space saving and cost reduction. A cylindrical outer rotor 11 is rotatable around a central axis CL thereof. A plurality of magnets 13 are arranged at equal intervals on an inner circumferential surface of the outer rotor 11. Three Hall elements 15 to 17 are arranged to oppose the respective magnets 13 and detect switching of magnetic poles caused by movement of the respective magnets 13 passing through each vicinity of the Hall elements 15 to 17 when the outer rotor 11 rotates. The Hall element 17 is comprised of a linear Hall element that outputs a linear signal representing a linear change of a magnetic flux density caused by movement of the respective magnets 13. One of the respective magnets 13 is arranged offset along the central axis CL as compared to the other magnets 13.

20 Claims, 8 Drawing Sheets

(51) Int. Cl.
  *H02K 1/27*   (2006.01)
  *G01D 5/14*   (2006.01)
  *H02K 16/04*  (2006.01)
  *H02K 21/22*  (2006.01)
  *H02P 6/16*   (2016.01)
  *H02K 11/33*  (2016.01)

(52) U.S. Cl.
  CPC .............. *H02K 21/22* (2013.01); *H02K 29/08* (2013.01); *H02K 11/33* (2016.01); *H02P 6/16* (2013.01)

(58) Field of Classification Search
  USPC ....................................................... 324/207.2
  See application file for complete search history.

(56) References Cited

U.S. PATENT DOCUMENTS

2004/0245957 A1    12/2004  Shibata et al.
2013/0099706 A1*    4/2013  Ng ............................ H02P 6/10
                                                    318/400.23

FOREIGN PATENT DOCUMENTS

JP         4766563      9/2011
WO    WO 2012/169156   12/2012

* cited by examiner

PRIOR ART

PRIOR ART

MOTOR, ROTATION PERIOD DETECTION METHOD THEREOF, MOTOR ROTATION PERIOD DETECTION SENSOR ASSEMBLY, AND POWER GENERATOR

BACKGROUND OF THE INVENTION

Field of the Invention

The present invention relates to a motor, a rotation period detection method thereof, a motor rotation period detection sensor assembly, and a power generator, and particularly to a three-phase brushless motor and a rotation period detection method thereof.

Description of the Related Art

Recently, a driving motor served also as a power generator often applied to vehicles or motorcycles. A three-phase brushless motor is often used as the driving motor. The three-phase brushless motor is provided with a cylindrical outer rotor 160 of which one end is opened, a plurality of stators 161 which are housed inside the outer rotor 160 and radially protrude from a central axis of the outer rotor 160, and a plurality of magnets 162 which are arranged at equal intervals on an inner circumferential surface of the outer rotor 160 as illustrated in FIG. 16. The plurality of magnets 162 have alternately different magnetic poles.

It is necessary to apply three-phase AC voltages to each coil of the stators 161 in order to cause the three-phase brushless motor to function as the driving motor, and thus, three phases (a U-phase, a V-phase, and a W-phase) in the three-phase brushless motor are detected, and used for converting, for example, a voltage applied from a battery into the three-phase AC voltages. To correspond to this, three pulsed Hall elements 163 are arranged among the respective stators 161 corresponding to the U-phase, the V-phase, and the W-phase, respectively, in the three-phase brushless motor, and each of the pulsed Hall elements 163 outputs each switching timing of the magnetic pole of the U-phase, the V-phase, and the W-phase of each of the magnets 162 relatively moving with respect to each of the pulsed Hall elements 163 as a pulsed signal.

In addition, in the three-phase brushless motor, the outer rotor 160 is connected with a crankshaft and thus, an ignition period of an engine which matches with a rotation period of the crankshaft can be detected. The ignition period of the engine needs to be detected once per single rotation of the outer rotor 160, and thus, is different from each period of the three phases. Thus, one rotation period detecting magnet 164 is provided on, for example, an outer circumferential surface of the outer rotor 160, a pulsed Hall element 165 for detection of the rotation period is provided to oppose the rotation period detecting magnet 164, and the pulsed Hall element 165 detects a change of a magnetic flux density caused by the rotation period detecting magnet 164, thereby outputting the rotation period of the outer rotor 160 as a pulsed signal.

Meanwhile, the rotation period detecting magnet 164 is provided separately from the magnets 162 are in order to detect individually the ignition period of the engine in the above-described three-phase brushless motor, but a three-phase brushless motor, which abolishes the rotation period detecting magnet 164 has been proposed in order to realize reduction in the number of parts for cost reduction and space saving. In such a three-phase brushless motor, not only the pulsed Hall elements 163 for detection of the three phases but also the pulsed Hall element 165 for detection of the rotation period is also arranged among the respective stators 161 as illustrated in FIG. 17. At this time, only the pulsed Hall element 165 is arranged offset in the central-axis direction of the outer rotor 160, and one of the magnets 162 is arranged offset in the opposite direction of the pulsed Hall element 165 as illustrated in FIG. 18. To be specific, a relative movement trajectory (indicated by the broken line in FIG. 18) of the pulsed Hall element 165 with respect to each of the magnets 162 opposes the respective magnets 162 except for the offset magnet 162, while respective relative movement trajectories (indicated by the alternate long and short dash line in FIG. 18) of the pulsed Hall elements 163 with respect to each of the magnets 162 oppose all the magnets 162. Accordingly, each of the pulsed Hall elements 163 for detection of the three phases is capable of detecting the switching of the magnetic pole caused by movement of the all magnets 162 including the offset magnet 162 without missing, but the pulsed Hall element 165 is difficult to detect the switching of the magnetic pole caused by the offset magnet 162. As a result, each of the pulsed Hall elements 163 outputs a pulsed signal that covers the switching of the magnetic poles of the three phases caused by the all magnets 162 including the offset magnet 162 without missing as illustrated in FIG. 19, while the pulsed Hall element 165 merely outputs a pulsed signal which lacks the switching of the magnetic pole caused by the offset magnet 162. That is, apart lacking the switching of the magnetic pole of the pulsed signal output from the pulsed Hall element 165 corresponds to the timing at which the pulsed Hall element 165 just opposes the offset magnet 162, and thus, the part lacking the switching of the magnetic pole of the pulsed signal of the pulsed Hall element 165 is detected with reference to the switching of the magnetic pole of the three phases, thereby detecting the rotation period of the outer rotor 160, that is, the ignition period of the engine. Although the number of the pulsed Hall elements 163 for detection of the three phases is different from the example mentioned above, a power generation device for a vehicle, which is an example of such a three-phase brushless motor in which one magnet is provided to be offset detecting an ignition period of an engine, is described in Japanese Patent No. 4766563.

However, the three-phase brushless motor illustrated in FIGS. 16 and 17 requires the pulsed Hall element for detection of the rotation period in addition to the pulsed Hall elements 163 for detection of the three phases, that is, requires the four pulsed Hall elements, and thus, it is difficult to realize further space saving and cost reduction.

SUMMARY OF THE INVENTION

The invention provides a motor, a rotation period detection method thereof, a motor rotation period detection sensor assembly, and a power generator capable of realizing further space saving and cost reduction.

Accordingly, a first aspect of the invention provides a motor which includes a cylindrical outer rotor that is rotatable around a central axis thereof, a plurality of magnets that are arranged at equal intervals on an inner circumferential surface of the outer rotor, a plurality of stators that are housed inside the outer rotor and radially protrude from the central axis, and three Hall elements that are arranged to oppose the plurality of magnets, and in which the three Hall elements detect switching of magnetic poles caused by movement of the plurality of magnets passing through each vicinity of the Hall elements when the outer rotor rotates, at least one of the Hall elements is comprised of a linear Hall element which outputs a linear signal representing a linear change of a magnetic flux density caused by movement of the plurality of magnets, and at least one of the magnets is comprised of an offset magnet which is arranged offset along the central axis as compared to the other magnets.

Accordingly, a second aspect of the invention provides a motor which includes a cylindrical outer rotor that is rotatable around a central axis thereof, a plurality of magnets that are arranged at equal intervals on an inner circumferential surface of the outer rotor, a plurality of stators that are housed inside the outer rotor and radially protrude from the central axis, and three Hall elements that are arranged to oppose the plurality of magnets, and in which the three Hall elements detect switching of magnetic poles caused by movement of the plurality of magnets passing through each vicinity of the Hall elements when the outer rotor rotates, at least one of the Hall elements is comprised of a linear Hall element which outputs a linear signal representing a linear change of a magnetic flux density caused by movement of the plurality of magnets, and an absolute value of a magnetic force of at least one of the magnets is set to be larger than an absolute value of each magnetic force of the other magnets.

Accordingly, a third aspect of the invention provides a method of detecting a rotation period of a motor which includes a cylindrical outer rotor that is rotatable around a central axis thereof, a plurality of magnets that are arranged at equal intervals on an inner circumferential surface of the outer rotor, a plurality of stators that are housed inside the outer rotor and radially protrude from the central axis, and three Hall elements that are arranged to oppose the plurality of magnets, and in which the three Hall elements detect switching of magnetic poles caused by movement of the plurality of magnets passing through each vicinity of the Hall elements when the outer rotor rotates, at least one of the Hall elements is comprised of a linear Hall element which outputs a linear signal representing a linear change of a magnetic flux density caused by movement of the plurality of magnets, and at least one of the magnets is comprised of an offset magnet which is arranged offset along the central axis as compared to the other magnets, the method of detecting the rotation period of the motor including analyzing the linear signal representing the linear change of the magnetic flux density using two thresholds.

Accordingly, a fourth aspect of the invention provides a sensor assembly applied to a motor which includes a cylindrical outer rotor that is rotatable around a central axis thereof, a plurality of magnets that are arranged at equal intervals on an inner circumferential surface of the outer rotor, and a plurality of stators that are housed inside the outer rotor and radially protrude from the central axis, and in which at least one of the magnets is comprised of an offset magnet which is arranged offset along the central axis as compared to the other magnets, the sensor assembly including three Hall elements that are arranged to oppose the plurality of magnets, and an analysis circuit that includes two comparators, in which the three Hall elements detect switching of magnetic poles caused by movement of the plurality of magnets when the outer rotor rotates, at least one of the Hall elements is comprised of a linear Hall element that outputs a linear signal representing a linear change of a magnetic flux density caused by movement of the plurality of magnets, the two comparators are connected to the linear Hall element, the linear signal representing the linear change of the magnetic flux density and a threshold are input to each of the comparators, the respective thresholds input to the respective comparators are different from one another, and the analysis circuit analyzes the linear signal representing the linear change of the magnetic flux density using the respective thresholds.

Accordingly, a fifth aspect of the invention provides a power generator which includes a cylindrical outer rotor that is rotatable around a central axis thereof, a plurality of magnets that are arranged at equal intervals on an inner circumferential surface of the outer rotor, a plurality of stators that are housed inside the outer rotor and radially protrude from the central axis, and three Hall elements that are arranged to oppose the plurality of magnets, and in which the three Hall elements detect switching of magnetic poles caused by movement of the plurality of magnets passing through each vicinity of the Hall elements when the outer rotor rotates, at least one of the Hall elements is comprised of a linear Hall element that outputs a linear signal representing a linear change of a magnetic flux density caused by movement of the plurality of magnets, and at least one of the magnets is comprised of an offset magnet that is arranged offset along the central axis as compared to the other magnets.

According to the invention, the at least one Hall element of the three Hall elements arranged to oppose the plurality of magnets is comprised of the linear Hall element that outputs the linear signal representing the linear change of the magnetic flux density caused by movement of the plurality of magnets, and the at least one magnet is comprised of the offset magnet arranged offset along the central axis of the cylindrical outer rotor as compared to the other magnets. That is, a distance from the offset magnet to the linear Hall element when the offset magnet passes through the vicinity of the linear Hall element is different from distance from each of the other magnets to the linear Hall element when each of the other magnets passes through the vicinity of the linear Hall element. Alternatively, the absolute value of the magnetic force of the at least one magnet is set to be larger than the absolute value of each magnetic force of the other magnets. As a result, an change status of the magnetic flux density caused by the movement of the offset magnet or an change status of the magnetic flux density caused by the movement of the magnet, which is set to have the large absolute value in the magnetic force detected by the linear Hall element is different from an change status of the magnetic flux density caused by the movement of the other magnets, and appears as a specific point in the change status in the linear signal representing the linear change of the magnetic flux density. Therefore, when the specific point of the change status in the linear signal representing the linear change of the magnetic flux density is detected, it is possible to detect a timing at which the offset magnet or the magnet set to have the large absolute value in the magnetic force passes through the vicinity of the linear Hall element. Herein, each rotation period of the offset magnet or the magnet set to have the large absolute value in the magnetic force is nothing but a rotation period of the outer rotor, and thus, in this invention, it is possible to detect the rotation period of the outer rotor as well as to detect the switching of the magnetic poles (of three phases) caused by the movement of the plurality of magnets in the three Hall elements. As a result, it is possible to realize further space saving and cost reduction.

Further features of the present invention will become apparent from the following description of exemplary embodiments (with reference to the attached drawings).

DESCRIPTION OF THE EMBODIMENTS

Hereinafter, an embodiment of the invention will be described with reference to the drawings.

Figure 1:
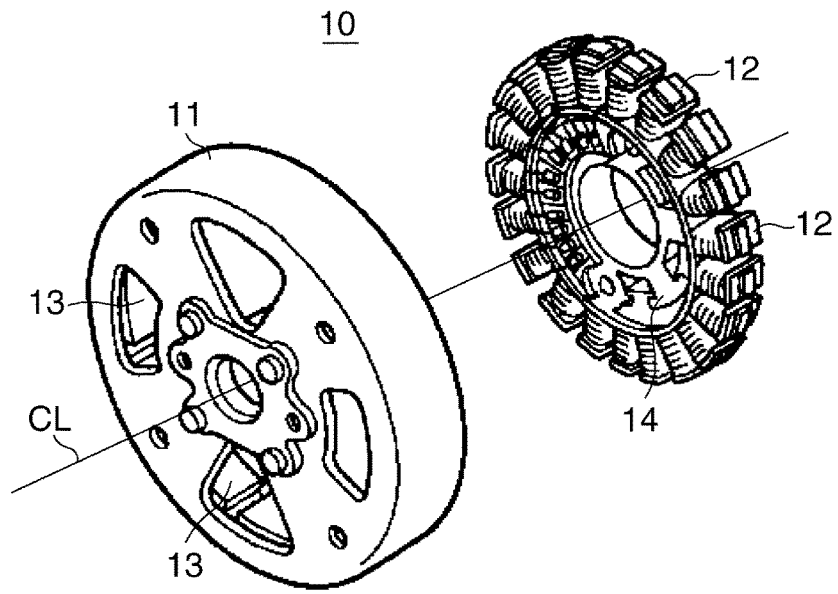
FIG. 1 is an exploded perspective view illustrating main components of a motor according to an embodiment of the invention.
Figure 2:
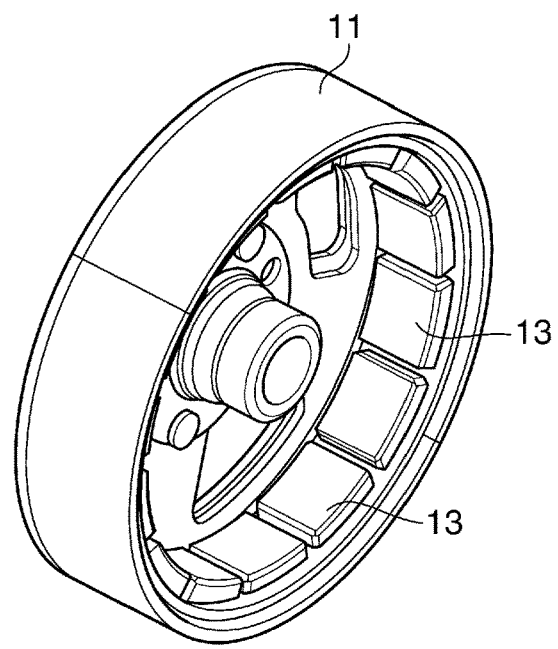
FIG. 2 is a perspective view of an outer rotor in FIG. 1.

FIG. 1 is an exploded perspective view showing main components of a motor according to the embodiment, and FIG. 2 is a perspective view of an outer rotor in FIG. 1.

In FIG. 1, a motor 10 is comprised of a three-phase brushless motor, and is provided with a cylindrical outer rotor 11 of which one end is opened, a plurality of stators 12 which are housed inside the outer rotor 11 and radially protrude from a central axis CL of the outer rotor 11, and a plurality of magnets 13 which are arranged at equal intervals on the inner circumferential surface of the outer rotor 11.

Each of the stators 12 is formed of a stator core which is an iron core and a coil wound around the stator core, and erects outwardly from the rim of an annular base 14 arranged coaxially with the central axis CL of the outer rotor 11. The base 14 is fixed to an engine body structure (not shown), for example, a cylinder block.

The outer rotor 11 is engaged with a crankshaft (not shown) which is a shaft arranged along the central axis CL, and rotates together with the crankshaft. The respective magnets 13 are form of magnet plates each having a substantially rectangular shape, and have alternately different magnetic poles on the inner circumferential surface of the outer rotor 11 with regard to a circumferential direction of the outer rotor 11.

In the motor 10, the outer rotor 11 is rotationally driven by an electromagnetic force when three-phase AC voltages are applied to each coil of the plurality of stators 12, thereby generating a rotational torque of the crankshaft. Meanwhile, the coils of the plurality of stators 12 are caused to generate current through electromagnetic induction when the outer rotor 11 is rotated by the crankshaft, thereby generating electric power.

In addition, the motor 10 is provided with three Hall elements 15 to 17 which are arranged among the respective stators 12 to oppose the respective magnets 13. When the outer rotor 11 rotates, each of the magnets 13 passes through the vicinity of each of the Hall elements 15 to 17, each magnetic flux density detected by the Hall elements 15 to 17 is periodically changed since the respective magnets 13 have alternately different magnetic poles as described above. Each of the Hall elements 15 and 16 is comprised of a pulsed Hall element, and outputs a switching timing of the magnetic pole in the detected magnetic flux density as a pulsed signal. The Hall element 17 is comprised of a linear Hall element, and outputs a signal which represents a linear change of the detected magnetic flux density. The respective Hall elements 15 to 17 are arranged to be separated from each other in order to detect changes during respective single period of the magnetic flux densities generated by the same pair of 13 in a shifted manner each by 120°. To be specific, the Hall element 15 detects a V-phase, the Hall element 16 detects a W-phase, and the Hall element 17 detects a U-phase.

Figure 3:
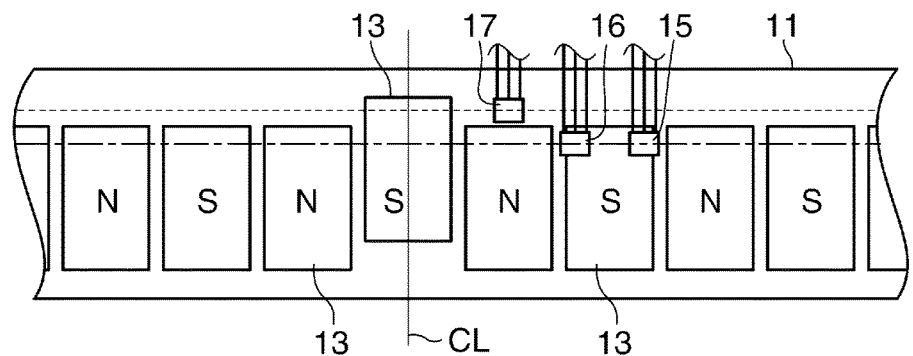
FIG. 3 is a diagram indicating arrangement of each magnet and arrangement of each Hall element when an inner circumferential surface of the outer rotor is viewed from a central axis of the outer rotor with an open end side of the outer rotor as the top.

FIG. 3 is a diagram indicating arrangement of the respective magnets 13 and an arrangement of the respective Hall elements 15 to 17 when the inner circumferential surface of the outer rotor 11 is viewed from the central axis CL of the outer rotor 11 with the open end side of the outer rotor 11 as the top.

In FIG. 3, among the respective magnets 13, one of the S-pole magnets 13 is arranged offset toward the open end side of the outer rotor 11 (the upper side in FIG. 3) in relation to a direction along the central axis CL (hereinafter, referred to as a "central-axis direction") as compared to the other magnets 13. It should be noted that the magnet 13 arranged offset toward the open end side of the outer rotor 11 will be referred to as the "offset magnet 13", hereinafter. Since the single offset magnet 13 is present, the timing of the change of the magnetic flux density, caused by the movement of the offset magnet 13, and the rotation period of the outer rotor 11 match each other when the outer rotor 11 rotates. Therefore, it is possible to detect the rotation period of the outer rotor 11 by detecting the timing of the change of the magnetic flux density caused by the movement of the offset magnet 13.

Figure 4:
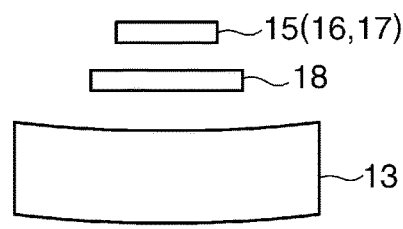
FIG. 4 is a plan view indicating an arrangement state of a magnetic flux collecting plate.

In addition, the Hall elements 15 and 16 are arranged at the same position in relation to the central-axis direction, but the Hall element 17 is arranged offset toward the open end side of the outer rotor 11 as compared to the Hall elements 15 and 16, and arranged to be separated from the non-offset magnets 13 (hereinafter, referred to as the "other magnets 13") farther than the Hall elements 15 and 16 in relation to the central-axis direction. That is, the offset magnet 13 and the Hall element 17 are offset toward the same open end side of the outer rotor 11, and thus, the Hall element 17 is closer to the offset magnet 13 than the Hall elements 15 and 16, and the offset magnet 13 is closer to the Hall element 17 than the other magnets 13. To be specific, when the outer rotor 11 rotates, a relative movement trajectory (indicated by the alternate long and short dash line in FIG. 3) drawn by the Hall elements 15 and 16 with respect to the moving respective magnets 13 opposes all the magnets 13 while a relative movement trajectory (indicated by the broken line in FIG. 3) drawn by the Hall element 17 with respect to the moving respective magnets 13 opposes only the offset magnet 13 and does not oppose the other magnets 13. It should be noted that a magnetic flux collecting plate 18 is arranged between each of the Hall elements 15 to 17 as shown in FIG. 4, and each of the corresponding magnets 13, thereby improving the detection sensitivity of the magnetic flux densities according to the respective Hall elements 15 to 17.

Figure 5:
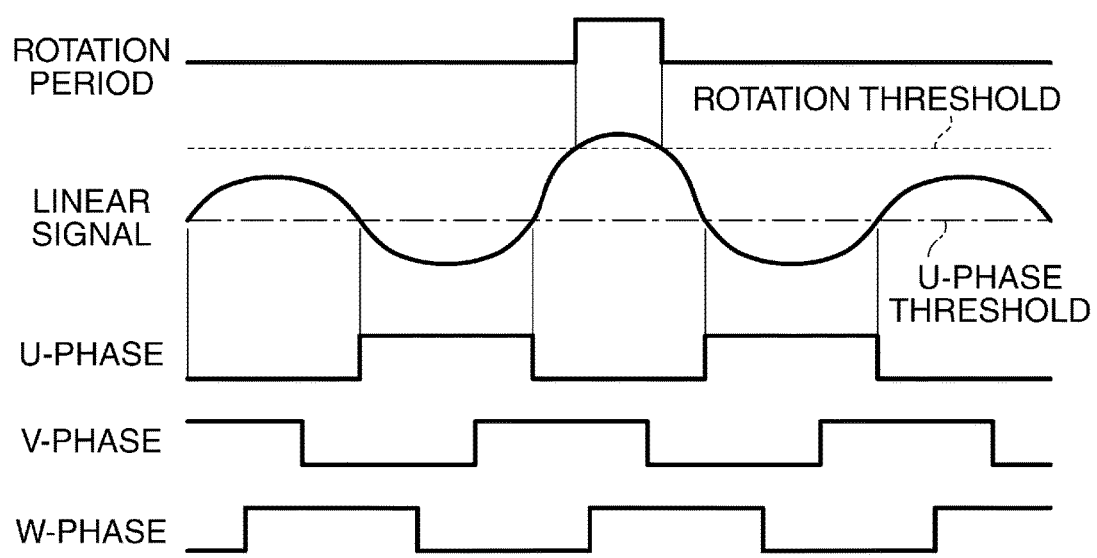
FIG. 5 is a diagram indicating signals output from the Hall elements in FIG. 3.

FIG. 5 is a diagram indicating signals output from the Hall elements 15 to 17 in FIG. 3.

In FIG. 5, the Hall element 15 outputs the switching timing of the magnetic pole of the V-phase as a pulsed signal, and the Hall element 16 outputs the switching timing of the magnetic pole of the W-phase as a pulsed signal when the outer rotor 11 rotates.

On the other hand, the Hall element 17 outputs a linear signal representing the linear change of the magnetic flux density caused by the movement of each of the magnets 13 (hereinafter, referred simply to as a "linear signal"). A distance from each of the other magnets 13 to the Hall element 17 is not changed when the other magnets 13 pass through the vicinity of the Hall element 17, and thus, an absolute value of a magnetic flux density detected by the Hall element 17 is not changed. On the other hand, a distance from the offset magnet 13 to the Hall element 17 when the offset magnet 13 passes through the vicinity of the Hall element 17 is shorter than the distance from each of the other magnets 13 to the Hall element 17 when each of the other magnets 13 passes through the vicinity of the Hall element 17, and thus, an absolute value of a magnetic flux density (hereinafter, referred to as the "magnetic flux density of the offset magnet 13") detected by the Hall element 17 when the offset magnet 13 passes through the vicinity of the Hall element 17 is larger than the absolute value of the magnetic flux density (hereinafter, referred to as the "magnetic flux density of the other magnets 13") detected by the Hall element 17 when each of the other magnets 13 passes through the vicinity of the Hall element 17.

To correspond to this, the switching timing of the magnetic pole of the U-phase and the rotation period of the outer rotor 11 are detected from the linear signal using two thresholds. To be specific, a value (hereinafter, referred to as a "U-phase threshold") (indicated by the alternate long and short dash line in FIG. 5), which is smaller than both the absolute value of the magnetic flux density caused by the other magnets 13, and the absolute value of the magnetic flux density caused by the offset magnet 13, for example, a zero-level value is set as the threshold for detection of the switching timing of the magnetic pole of the U-phase. In addition, a value (hereinafter, referred to as a "rotation threshold") (indicated by the broken line in FIG. 5), which is larger than the absolute value of the magnetic flux density caused by the other magnets 13 and is smaller than the absolute value of the magnetic flux density caused by the offset magnet 13, is set as the threshold for detection of the rotation period of the outer rotor 11.

When the linear signal rises or drops, the linear signal exceeds or falls below the U-phase threshold as long as the magnetic pole of the magnetic flux density detected by the Hall element 17 is switched, and thus, the timing at which the linear signal exceeds or falls below the U-phase threshold is considered as the timing at which the magnetic pole of the magnetic flux density detected by the Hall element 17 is switched, that is, the switching timing of the magnetic pole of the U-phase in the embodiment. In addition, the absolute value of the magnetic flux density caused by the offset magnet 13 is larger than the absolute value of the magnetic flux density caused by the other magnets 13 as described above, and thus, a timing at which the linear signal exceeds the rotation threshold is considered as a timing at which the offset magnet 13 passes through the vicinity of the Hall element 17, that is, the rotation period in the embodiment.

In the motor 10, the switching timing of the magnetic pole of the U-phase and the rotation period are detected based on the linear signal by an analysis circuit 19 to be described later.

Figure 6:
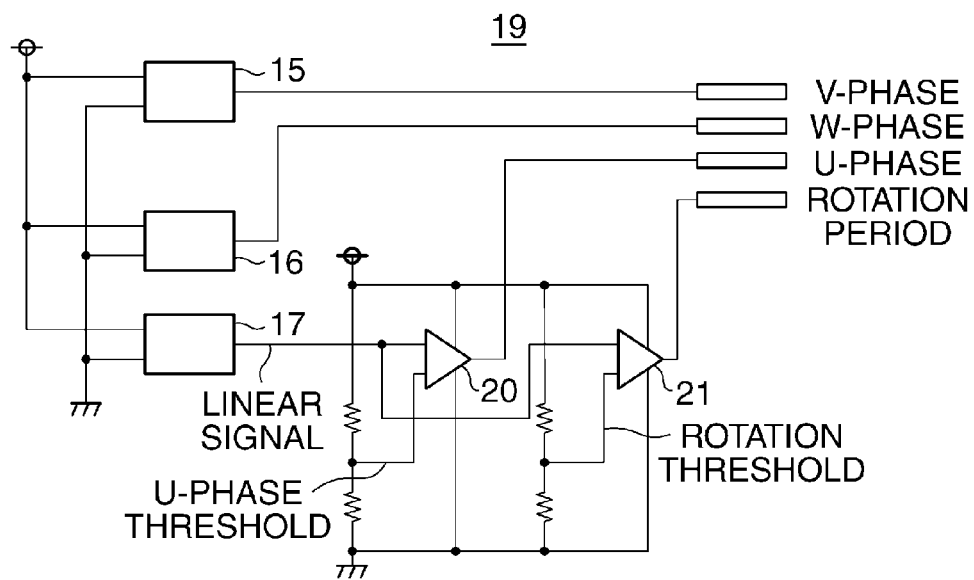
FIG. 6 is a circuit diagram illustrating a configuration of an analysis circuit provided in the motor of FIG. 1.

FIG. 6 is a circuit diagram showing a configuration of the analysis circuit 19 provided in the motor 10.

In FIG. 6, the analysis circuit 19 includes the Hall elements 15 to 17 and two comparators 20 and 21 which are connected, respectively, to an output end of the Hall element 17. The Hall elements 15 and 16 output the switching timings of the magnetic poles of the V-phase and the W-phase as the pulsed signals. On the other hand, the Hall element 17 outputs the linear signal, the U-phase threshold and the output linear signal are input to the comparator 20, the comparator 20 outputs, for example, zero when the linear signal exceeds the U-phase threshold, and outputs, for example, one when the linear signal falls below the U-phase threshold. That is, the comparator 20 outputs the switching timing of the magnetic pole of the U-phase, which is the timing at which the linear signal exceeds or falls below the U-phase threshold, as the pulsed signal. The rotation threshold and the linear signal are input to the comparator 21, and the comparator 21 outputs, for example, one when the linear signal exceeds the rotation threshold, and outputs, for example, zero when the linear signal falls below the rotation threshold. That is, the comparator 21 outputs the rotation period which is the timing at which the linear signal exceeds the rotation threshold as the pulsed signal. It should be noted that the analysis circuit 19 is provided in a base plate 23 of a sensor assembly 22 in the embodiment to be described later.

In addition, the Hall elements 15 to 17 are assembled on consideration of assembling workability and the like in the motor 10.

Figure 7:
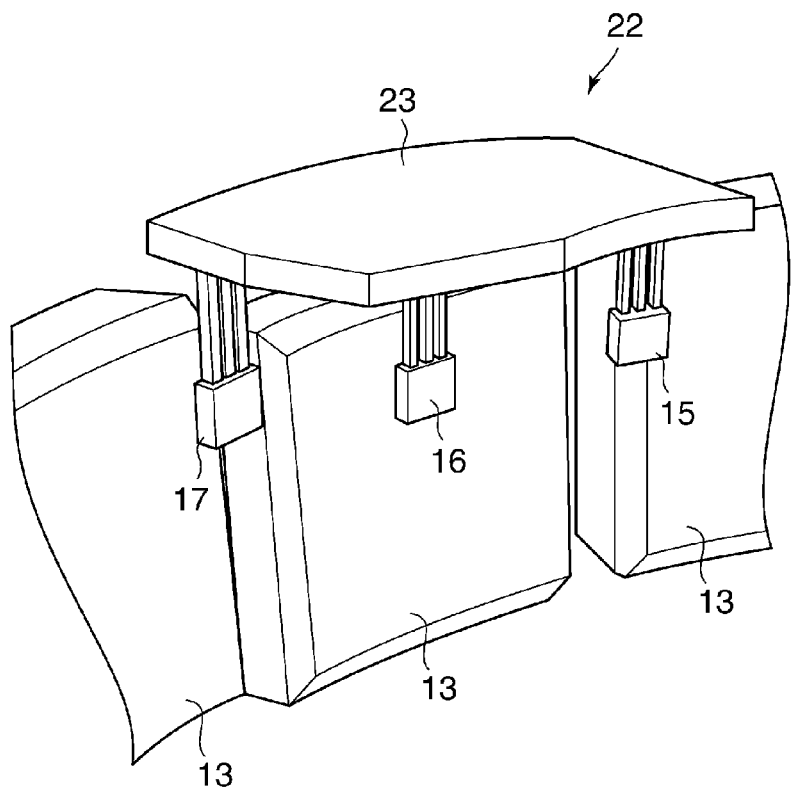
FIG. 7 is a perspective view schematically illustrating a configuration of a sensor assembly including the Hall elements.

FIG. 7 is a perspective view schematically showing a configuration of the sensor assembly which includes the Hall elements 15 to 17. The upper side of FIG. 7 is the open end side of the outer rotor 11, and the vertical direction of FIG. 7 matches the central-axis direction.

In FIG. 7, the sensor assembly 22 is arranged along or horizontally with respect to the central-axis direction, and includes the base plate 23, which is arranged on the open end side of the outer rotor 11 than each of the stators 12, and the Hall elements 15 to 17 which protrude from the base plate 23 toward the opposite side to the open end side of the outer rotor 11. The Hall elements 15 to 17 intrude between the respective stators 12 (not shown) and oppose the respective magnets 13. A protruding amount of the Hall element 17 from the base plate 23 is smaller than each protruding amount of the Hall elements 15 and 16 from the base plate 23, and thus, the Hall element 17 is arranged offset toward the open end side of the outer rotor 11 as compared to the Hall elements 15 and 16.

According to the motor 10, when the outer rotor 11 rotates, the linear signal of the Hall element 17 is analyzed by the analysis circuit 19, and the analysis circuit 19 using the two comparators 20 and 21 detects the timing at which the linear signal exceeds or falls below the U-phase threshold and outputs the detected timing as the switching timing of the magnetic pole of the U-phase in the pulsed signal as well as detects the timing at which the linear signal exceeds the rotation threshold and outputs the detected timing as the rotation period in the pulsed signal. That is, it is possible to detect both the switching timing of the magnetic pole of the U-phase and the rotation period using the single Hall element 17. As a result, it is possible to detect the switching timings of magnetic poles of the U-phase, the V-phase, and the W-phase and the rotation period using the three Hall elements 15 to 17, and hence it is possible to reduce the number of the Hall elements. In addition, it is possible to reduce a size of the base plate 23 for attachment of the respective Hall elements also in the sensor assembly 22. Accordingly, it is possible to realize further space saving and cost reduction.

In the motor 10, the offset magnet 13 is closer to the Hall element 17 than the other magnets 13, and the Hall element 17 is closer to the offset magnet 13 than the Hall elements 15 and 16. Further, the Hall element 17 is arranged to be separated from the other magnets 13 in relation to the central-axis direction farther than the Hall elements 15 and 16. Accordingly, the absolute value of the magnetic flux density caused by the offset magnet 13 detected by the Hall element 17 is reliably larger than the absolute value of the magnetic flux density caused by the other magnets 13 detected by the Hall element 17. As a result, it is possible to reliably detect the timing at which each of the offset magnets 13 passes through the vicinity of the Hall element 17, that is, the rotation period.

Since the pulsed Hall element is likely to cause a waveform breakage or timing (duty) disturbance by being affected by noise, it is not possible to accurately detect the rotation period when the pulsed Hall element is used for detection of the rotation period. In particular, when the rotation period is shifted in a case in which the detected rotation period is used for ignition control of the engine, such a shift influences badly on the advancing and retarding control of ignition timing. On the contrary, the linear Hall element is used for detection of the rotation period in the motor 10. In general, noise generated in the linear signal is likely to be detected as an abnormal value (for example, a local peak value or an unnatural inflection point) when the linear Hall element outputs the linear signal, it is preferable to perform a process of removing the noise on the linear signal, and it is possible to remove the noise by, for example, providing feedback resistors arranged to be parallel, respectively, to the comparators 20 and 21 in the analysis circuit 19 of FIG. 6, causing the comparators 20 and 21 to perform hysteresis operation, and performing a process of removing the abnormal value on the linear signal prior to forming the output waveform of the comparators 20 and 21.

As above, the invention has been described using the above-described embodiment, but the invention is not limited to the above-described embodiment.

For example, the magnet 13 may be arranged offset toward the opposite side to the open end side of the outer rotor 11 although the magnet 13 is arranged offset toward the open end side of the outer rotor 11 in the above-described motor 10.

Figure 8:
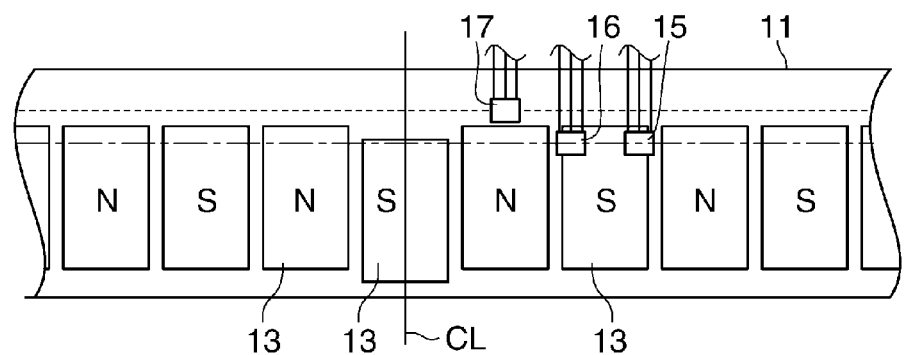
FIG. 8 is a diagram indicating arrangement of each magnet and arrangement of each Hall element when an inner circumferential surface of the outer rotor is viewed from a central axis of an outer rotor in a motor according to a first variation of the embodiment.

FIG. 8 is a diagram indicating arrangement of the respective magnets 13 and arrangement of the respective Hall elements 15 to 17 when the inner circumferential surface of the outer rotor 11 is viewed from the central axis CL of the outer rotor 11 in a motor according to a first variation of the embodiment.

In FIG. 8, among the respective magnets 13, the one S-pole magnet 13 is arranged offset toward the opposite side to the open end side of the outer rotor 11 in relation to the central-axis direction as compared to the other magnets 13, and as a result, the offset magnet 13 is distant from the Hall element 17 farther than the other magnets 13. It should be noted that the magnet 13 that is arranged offset toward the opposite side to the open end side of the outer rotor 11 will be referred to as a "second offset magnet 13" hereinafter.

Figure 9:
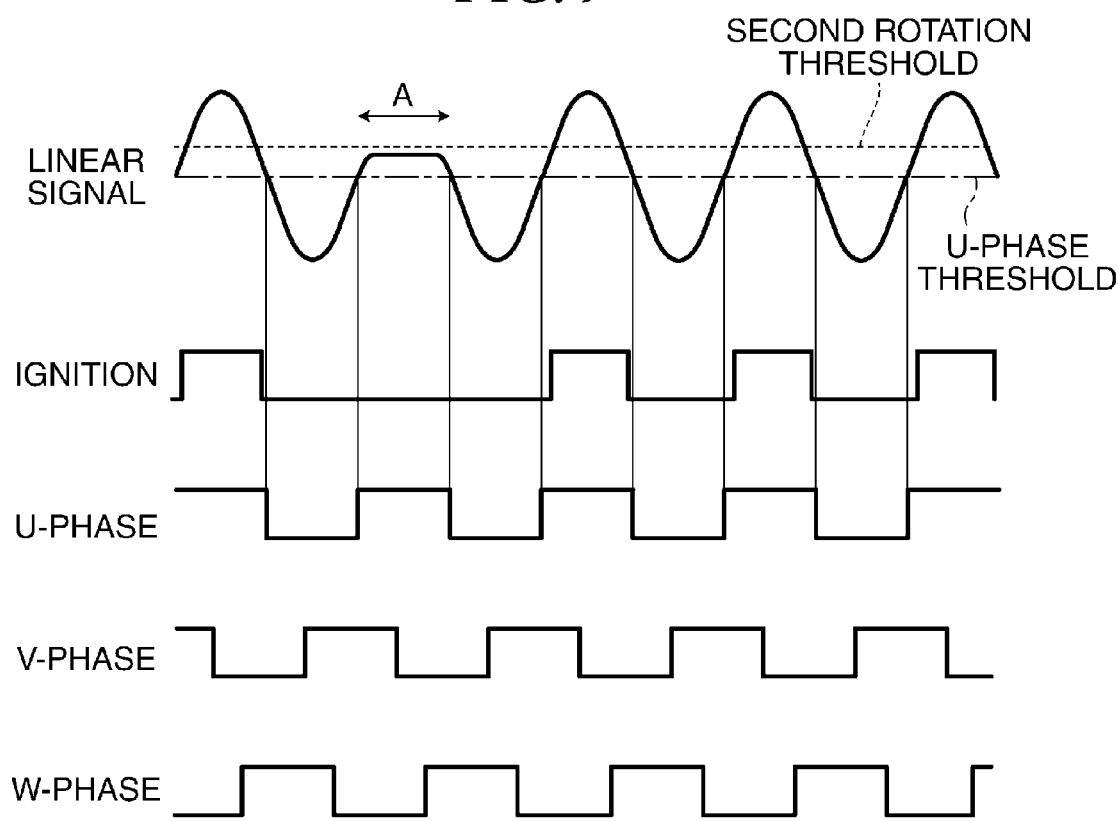
FIG. 9 is a diagram indicating signals output from the Hall elements in FIG. 8.

FIG. 9 is a diagram indicating signals output by the respective Hall elements 15 to 17 in FIG. 8.

In FIG. 9, a distance from the second offset magnet 13 to the Hall element 17 when the second offset magnet 13 passes through the vicinity of the Hall element 17 is longer than a distance from each of the other magnets 13 to the Hall element 17 when each of the other magnets 13 passes through the vicinity of the Hall element 17, and thus, an absolute value of a magnetic flux density which is detected by the Hall element 17 when the second offset magnet 13 passes through the vicinity of the Hall element 17 (hereinafter, referred to as "the magnetic flux density of the second offset magnet 13") is smaller than the absolute value of the magnetic flux density caused by the other magnets 13.

To correspond to this, the same U-phase threshold (indicated by the alternate long and short dash line in FIG. 9) as in FIG. 5, for example, the zero-level value is set as a threshold for detection of the switching timing of the magnetic pole of the U-phase, and a value (hereinafter, referred to as referred to as a "second rotation threshold") (indicated by the broken line in FIG. 9), which is smaller than the absolute value of the magnetic flux density caused by the other magnets 13 and is larger than the absolute value of the magnetic flux density caused by the second offset magnet 13 is set as a threshold for detection of the rotation period of the outer rotor 11 in the first variation.

Similarly to FIG. 5, the timing at which the linear signal exceeds or falls below the U-phase threshold is considered as the switching timing at which the magnetic pole of the magnetic flux density detected by the Hall element 17, that is, the switching timing of the magnetic pole of the U-phase in the first variation. In addition, the absolute value of the magnetic flux density caused by the second offset magnet 13 is larger than the U-phase threshold of the zero-level, but is smaller than the absolute value of the magnetic flux density caused by the other magnets 13 as described above. Therefore, there is no case in which the linear signal corresponding to the magnetic flux density caused by the second offset magnet 13 exceeds the second rotation threshold. Here, the comparator 21 outputs a pulsed signal lacking one pulse as compared to a pulsed signal output by the comparator 20 in a single rotation of the outer rotor 11 when the second rotation threshold is input to the comparator 21 of the analysis circuit 19 shown in FIG. 6. Thus, it is possible to detect the rotation period of the outer rotor 11 by comparing the pulsed signals of the U-phase, the V-phase, and the W-phase and the pulsed signal output by the comparator 21 so as to logically fix a period "A" shown in FIG. 9.

In addition, for example, a plurality of the offset magnets 13 may be provided to offset in the central-axis direction although only one of the offset magnets 13 is provided to offset in the above-described motor 10.

Figure 10:
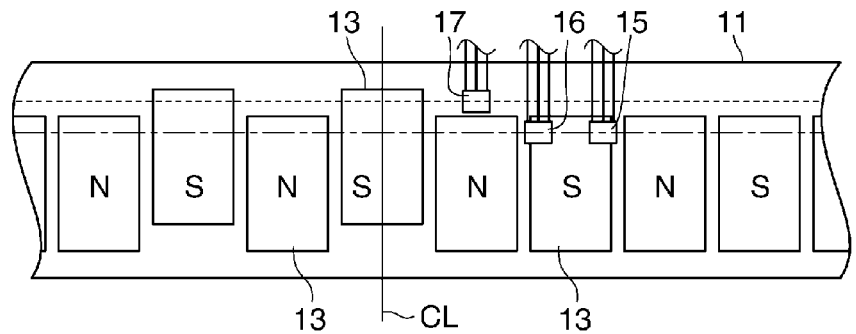
FIG. 10 is a diagram indicating arrangement of each magnet and arrangement of each Hall element when an inner circumferential surface of the outer rotor is viewed from a central axis of an outer rotor in a motor according to a second variation of the embodiment.

FIG. 10 is a diagram indicating arrangement of the respective magnets 13 and arrangement of the respective Hall elements 15 to 17 when the inner circumferential surface of the outer rotor 11 is viewed from the central axis CL of the outer rotor 11 in a motor according to a second variation of the embodiment.

In FIG. 10, among the respective magnets 13, two of the magnets 13 are arranged offset toward the open end side of the outer rotor 11 in relation to the central-axis direction as compared to the other magnets 13, and as a result, the two offset magnets 13 are closer to the Hall element 17 than the other magnets 13.

Figure 11:
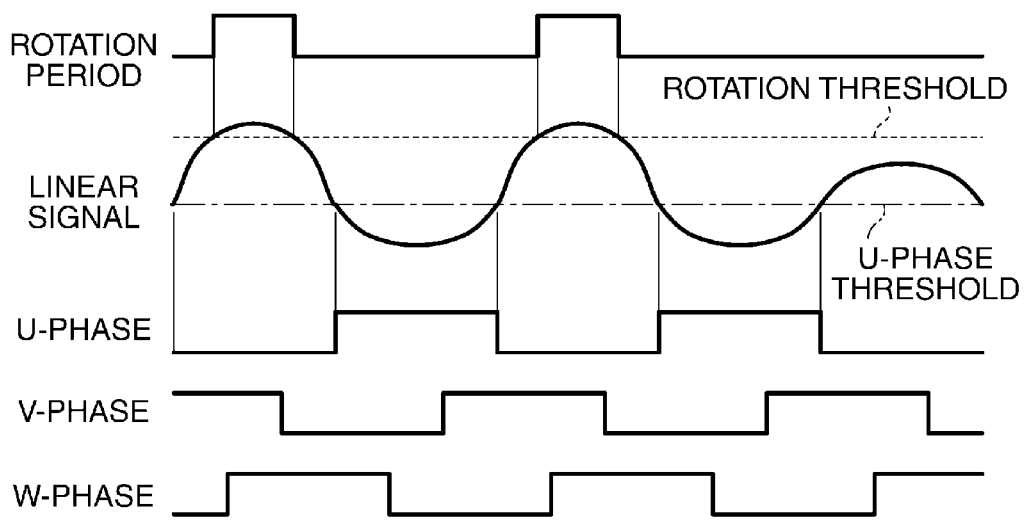
FIG. 11 is a diagram indicating signals output from the Hall elements in FIG. 10.

FIG. 11 is a indicating signals output by the respective Hall elements 15 to 17 in FIG. 10.

In FIG. 11, a distance from each of the two offset magnets 13 to the Hall element 17 when each of the two offset magnets 13 passes through the vicinity of the Hall element 17 is shorter than the distance from each of the other magnets 13 to the Hall element 17 when each of the other magnets 13 pass through the vicinity of the Hall element 17, and thus, the absolute value of the magnetic flux density of each of the two offset magnets 13 is larger than the absolute value of the magnetic flux density caused by the other magnets 13 similarly to FIG. 5.

To correspond to this, the same U-phase threshold (indicated by the alternate long and short dash line in FIG. 11) as in FIG. 5, for example, the zero-level value is set as a threshold for detection of the switching timing of the magnetic pole of the U-phase, and the same rotation threshold (indicated by the broken line in FIG. 11) as in FIG. 5 is set as a threshold for detection of the rotation period of the outer rotor 11 in the second variation.

Similarly to FIG. 5, a timing at which the linear signal exceeds or falls below the U-phase threshold is considered as the switching timing at which the magnetic pole of the magnetic flux density detected by the Hall element 17, that is, the switching timing of the magnetic pole of the U-phase in the second variation. In addition, the timing at which the linear signal exceeds the rotation threshold is considered as a timing at which each of the two offset magnets 13 passes through the vicinity of the Hall element 17, that is, a rotation period similarly to FIG. 5. Accordingly, it is possible to detect both the switching timing of the magnetic pole of the U-phase and the rotation period using the single Hall element 17.

In addition, the magnetic flux density of each of the two offset magnets 13 changes when each of the two offset magnets 13 passes through the vicinity of the Hall element 17, and thus, the linear signal includes two different timings at which each absolute value of the magnetic flux densities caused by the respective two offset magnet 13 is larger than the absolute value of the magnetic flux density caused by the other magnets 13 corresponding to the timing at which each of the two offset magnets 13 passes through the vicinity of the Hall element 17. Therefore, it is possible to detect each rotation period of the two offset magnets 13, that is, two rotation periods at different timings using the single Hall element 17 by detecting the timing at which the linear signal exceeds the rotation threshold.

Further, each offset amount of a third offset magnet 13 and a fourth offset magnet 13 may be set to different in the case of providing the plurality of (two) magnets 13 to be offset in the central-axis direction.

Figure 12:
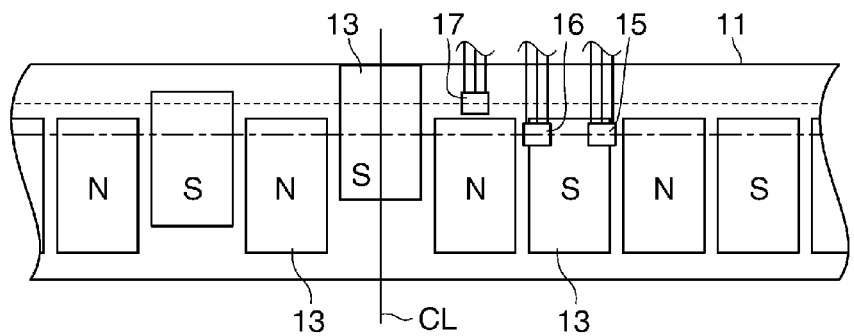
FIG. 12 is a diagram indicating arrangement of each magnet and arrangement of each Hall element when an inner circumferential surface of the outer rotor is viewed from a central axis of an outer rotor in a motor according to a third variation of the embodiment.

FIG. 12 is a diagram indicating arrangement of the respective magnets 13 and arrangement of the respective Hall elements 15 to 17 when the inner circumferential surface of the outer rotor 11 is viewed from the central axis CL of the outer rotor 11 in a motor according to a third variation of the embodiment.

In FIG. 12, among the respective magnets 13, the two magnets 13 are arranged offset toward the open end side of the outer rotor 11 in relation to the central-axis direction as compared to the other magnets 13, and as a result, the two offset magnets 13 are closer to the Hall element 17 than the other magnets 13. In addition, each offset amount of the two offset magnets 13 toward the open end side is different. Hereinafter, the offset magnet 13 which is offset the closest to the open end side will be referred to as the "the third offset magnet 13", and the offset magnet 13 which is positioned at the opposite side of the open end side than the third offset magnet 13 will be referred to as the "fourth offset magnet 13".

Figure 13:
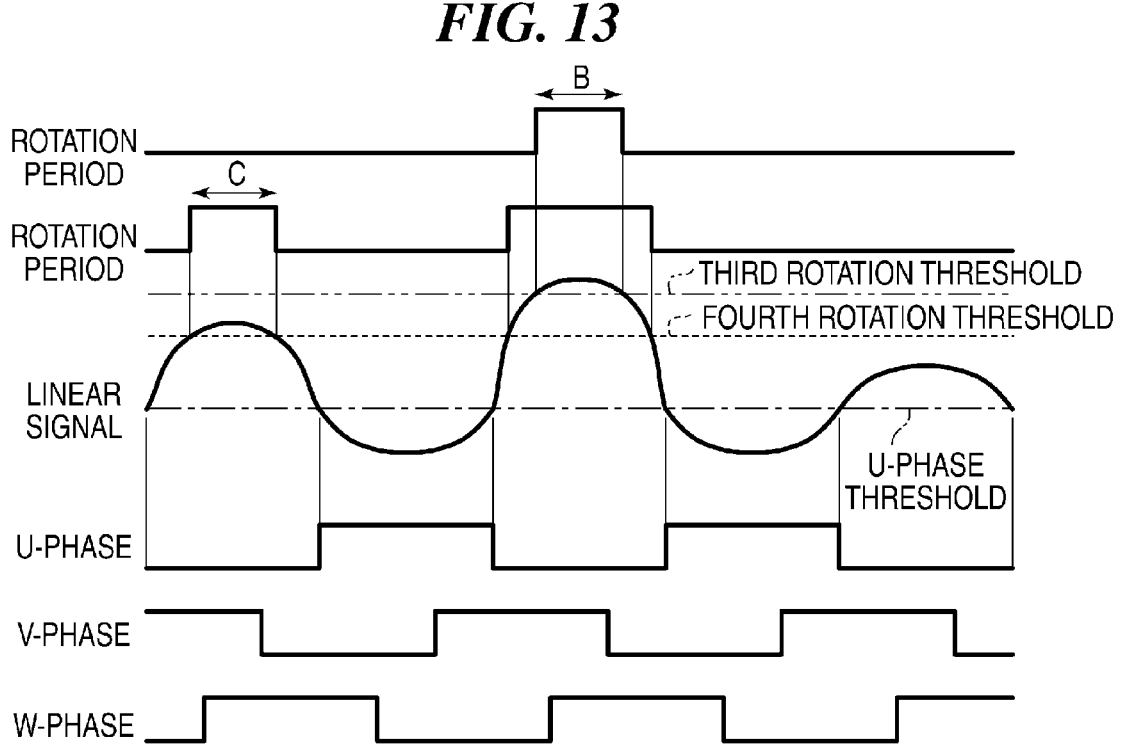
FIG. 13 is a diagram indicating signals output from the Hall elements in FIG. 12.

FIG. 13 is a indicating signals output by the respective Hall elements 15 to 17 in FIG. 12.

In FIG. 13, a distance from each of the third offset magnet 13 and the fourth offset magnet 13 to the Hall element 17 when each of the third offset magnet 13 and the fourth offset magnet 13 passes through the vicinity of the Hall element 17 is shorter than the distance from each of the other magnets 13 to the Hall element 17 when each of the other magnets 13 pass through the vicinity of the Hall element 17, and thus, an absolute value of a magnetic flux density which is detected by the Hall element 17 when the third offset magnet 13 passes through the vicinity of the Hall element 17 (hereinafter, referred to as the "magnetic flux density caused by the third offset magnet 13") and an absolute value of a magnetic flux density which is detected by the Hall element 17 when the fourth offset magnet 13 passes through the vicinity of the Hall element 17 (hereinafter, referred to as the "magnetic flux density caused by the fourth offset magnet 13") are larger than the absolute value of the magnetic flux density caused by the other magnets 13 similarly to FIG. 5. In addition, the distance from the third offset magnet 13 to the Hall element 17 when the third offset magnet 13 passes through the vicinity of the Hall element 17 is shorter than the distance from the fourth offset magnet 13 to the Hall element 17 when the fourth offset magnet 13 passes through the vicinity of the Hall element 17, and thus, the absolute value of the magnetic flux density caused by the third offset magnet 13 is larger than the absolute value of the magnetic flux density caused by the fourth offset magnet 13.

To correspond to this, the same U-phase threshold (indicated by the alternate long and short dash line in FIG. 13) as in FIG. 5, for example, the zero-level value is set as a threshold for detection of the switching timing of the magnetic pole of the U-phase, and a value (hereinafter, referred to as referred to as a "third rotation threshold") (indicated by the alternate long and two short dashes line in FIG. 13), which is larger than the absolute value of the magnetic flux density caused by the other magnets 13 and the absolute value of the magnetic flux density caused by the fourth offset magnet 13 and smaller than the absolute value of the magnetic flux density caused by the third offset magnet 13, is set and further, a value (hereinafter, referred to as a "fourth rotation threshold") (indicated by the broken line in FIG. 13), which is larger than the absolute value of the magnetic flux density caused by the other magnets 13 and is smaller than the absolute value of the magnetic flux density caused by the fourth offset magnet 13 and the absolute value of the magnetic flux density caused by the third offset magnet 13, are set as thresholds for detection of rotation periods of the outer rotor 11 in the third variation.

Similarly to FIG. 5, the timing at which the linear signal exceeds or falls below the U-phase threshold is considered as the switching timing at which the magnetic pole of the magnetic flux density detected by the Hall element 17, that is, the switching timing of the magnetic pole of the U-phase in the third variation. In addition, the absolute value of the magnetic flux density caused by the third offset magnet 13 becomes larger than the absolute value of the magnetic flux density caused by the fourth offset magnet 13 as described above, and thus, a timing at which a linear signal exceeds the third rotation threshold (a period "B" in FIG. 13) is considered as a timing at which the third offset magnet 13 passes through the vicinity of the Hall element 17. Further, the absolute value of the magnetic flux density caused by the fourth offset magnet 13 becomes larger than the absolute value of the magnetic flux density caused by the other magnets 13 and smaller than the absolute value of the magnetic flux density caused by the third offset magnet 13 as described above, and thus, a timing at which linear signal exceeds the fourth rotation threshold and does not exceed the third rotation threshold (a period "C" in FIG. 13) is considered as a timing at which the fourth offset magnet 13 passes through the vicinity of the Hall element 17. Both the timing at which the third offset magnet 13 passes through the vicinity of the Hall element 17 and the timing at which the fourth offset magnet 13 passes through the vicinity of the Hall element 17 correspond to the rotation periods of the outer rotor 11, and accordingly, it is possible to detect both the switching timing of the magnetic pole of the U-phase and the rotation period using the single Hall element 17.

In addition, the period "B" and the period "C" occur at the different timings as shown in FIG. 13, and thus, it is possible to detect the rotation period of the third offset magnet 13 and the rotation period of the fourth offset magnet 13, that is, the two rotation periods at different timings using the single Hall element 17.

In addition, for example, a magnetic force of only one of the magnets 13 may be set to be different from each magnetic force of the other magnets 13 although only one of the magnets 13 is provided to be offset in the above-described motor 10.

Figure 14:
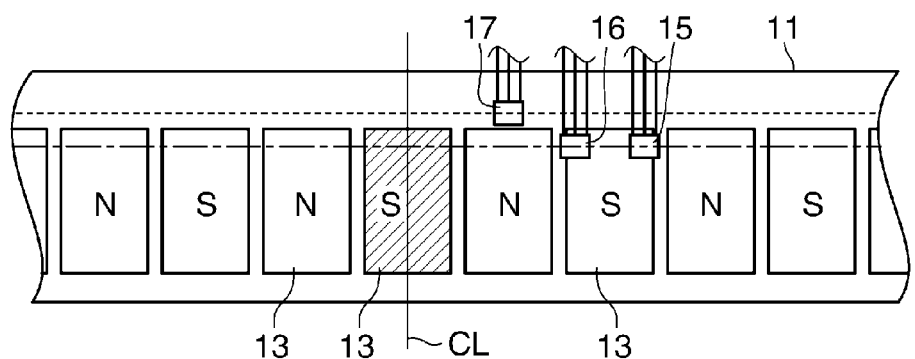
FIG. 14 is a diagram indicating arrangement of each magnet and arrangement of each Hall element when an inner circumferential surface of the outer rotor is viewed from a central axis of an outer rotor in a motor according to a fourth variation of the embodiment.

FIG. 14 is a diagram indicating arrangement of the respective magnets 13 and arrangement of the respective Hall elements 15 to 17 when the inner circumferential surface of the outer rotor 11 is viewed from the central axis CL of the outer rotor 11 in a motor according to a fourth variation of the embodiment.

In FIG. 14, an absolute value of a magnetic force of one of the magnets 13 which has S-pole is set to be larger than the absolute value of the magnetic force of the other magnets 13. It should be noted that the magnet 13 having the larger absolute value of the magnetic force set will be referred to as the "magnetic-force-changed magnet 13" (shown with the hatching in FIG. 14) hereinafter. Since there is the only one magnetic-force-changed magnet 13, it is possible to detect a rotation period of the outer rotor 11 by detecting a timing of change of a magnetic flux density caused by movement of the magnetic-force-changed magnet 13.

Figure 15:
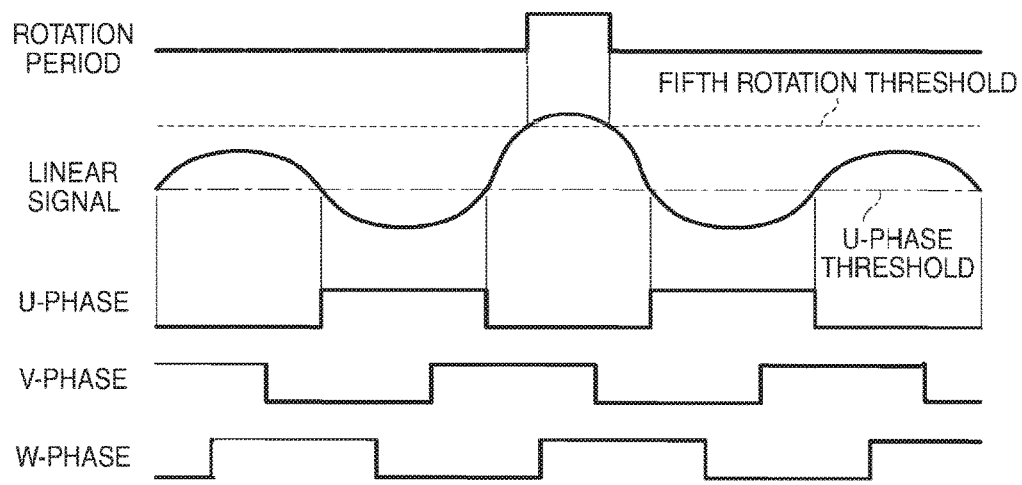
FIG. 15 is a diagram indicating signals output from the Hall elements in FIG. 14.
Figure 16:
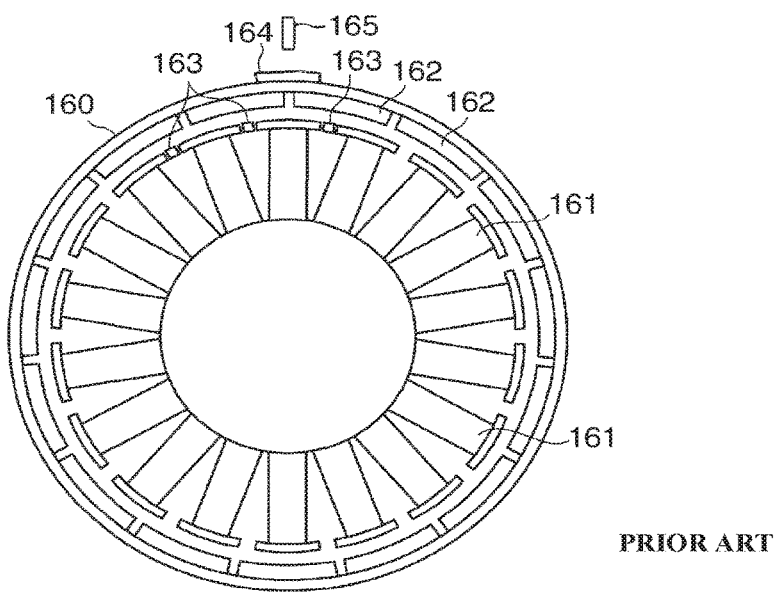
FIG. 16 is a front view schematically showing main components of a conventional three-phase brushless motor.
Figure 17:
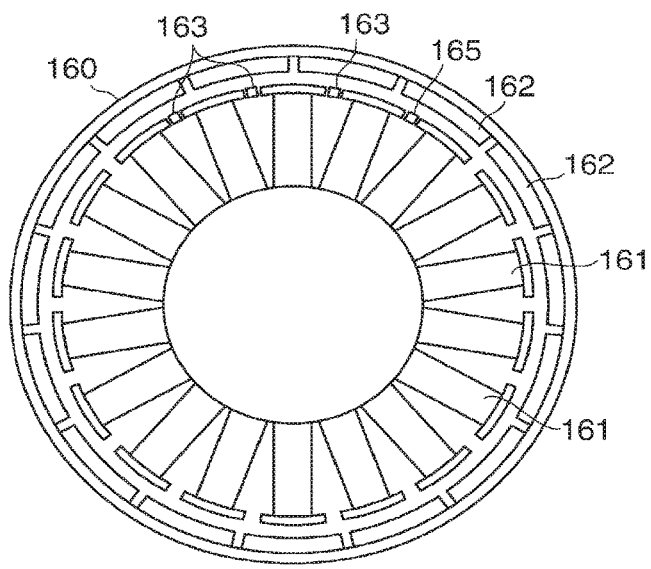
FIG. 17 is a front view schematically showing main components of a three-phase brushless motor that abolishes a rotation period detecting magnet.
Figure 18:
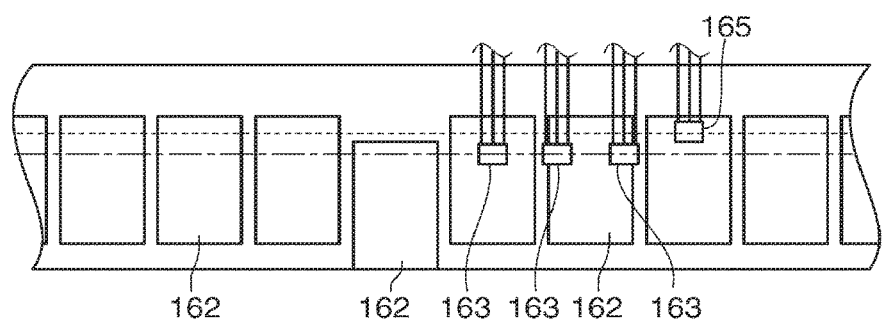
FIG. 18 is a diagram indicating arrangement of each magnet and arrangement of each pulsed Hall element in the three-phase brushless motor in FIG. 17 when an inner circumferential surface of an outer rotor is viewed.
Figure 19:
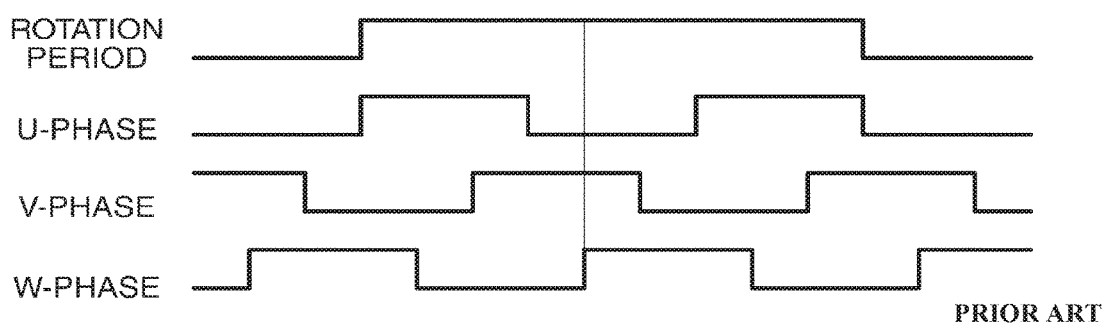
FIG. 19 is a diagram indicating signals output from the pulsed Hall elements in FIG. 18.

FIG. 15 is a diagram indicating signals output from the Hall elements 15 to 17 in FIG. 14.

When the other magnets 13 pass through the vicinity of the Hall element 17, each magnetic force of the other magnets 13 is not changed in FIG. 15, and thus, the absolute value of the magnetic flux density thereof, which is detected by the Hall element 17, is not changed. On the other hand, the absolute value of the magnetic force of the magnetic-force-changed magnet 13 is larger than the absolute value of the magnetic force of the other magnets 13 when the magnetic-force-changed magnet 13 passes through the vicinity of the Hall element 17, and thus, an absolute value of a magnetic flux density which is detected by the Hall element 17 when the magnetic-force-changed magnet 13 passes through the vicinity of the Hall element 17 (hereinafter, referred to as the "magnetic flux density caused by the magnetic-force-changed magnet 13") is larger than the absolute value of the magnetic flux density caused by the other magnets 13.

To correspond to this, the same U-phase threshold (indicated by the alternate long and short dash line in FIG. 15) as in FIG. 5, for example, the zero-level value is set as a threshold for detection of the switching timing of the magnetic pole of the U-phase, and a value (hereinafter, referred to as a "fifth rotation threshold") (indicated by the broken line in FIG. 15), which is larger than the absolute value of the magnetic flux density caused by the other magnets 13 and is smaller than the absolute value of the magnetic flux density caused by the magnetic-force-changed magnet 13 is set as a threshold for detection of a rotation period of the outer rotor 11 in the fourth variation.

Similarly to FIG. 5, the timing at which the linear signal exceeds or falls below the U-phase threshold is considered as the switching timing at which the magnetic pole of the magnetic flux density detected by the Hall element 17, that is, the switching timing of the magnetic pole of the U-phase in the fourth variation. In addition, the absolute value of the magnetic flux density caused by the magnetic-force-changed magnet 13 is larger than the absolute value of the magnetic flux density caused by the other magnets 13 as described above, and thus, a timing at which a linear signal exceeds the fifth rotation threshold is considered as a timing at which the magnetic-force-changed magnet 13 passes through the vicinity of the Hall element 17, that is, the rotation period in the fourth variation. Accordingly, it is possible to detect both the switching timing of the magnetic pole of the U-phase and the rotation period using the single Hall element 17.

It should be noted that the motor 10 according to the above-described embodiment may be applied not only to the driving motor (motor generator) which serves also as the power generator but also to a stator AC power generator, and can be applied to almost any three-phase brushless motor which serves also as a power generator.

In addition, the rotation period, which is detected by the motor 10 according to the embodiment, may be used not only for the ignition control of the engine, but also for another control using the rotation period of the crankshaft.

Further, the Hall element 17 is configured using the linear Hall element in the motor 10 according to the embodiment, but the Hall element 15 or the Hall element 16 may be configured using the linear Hall element, and the rotation period of the outer rotor 11 may be detected using the Hall element 15 or the Hall element 16.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-145722 filed on Jul. 23, 2015 which is hereby incorporated by reference herein in its entirety.

What is claimed is:

1. A motor comprising:
   a cylindrical outer rotor that is rotatable around a central axis thereof;
   a plurality of magnets that are arranged at equal intervals on an inner circumferential surface of the outer rotor;
   a plurality of stators that are housed inside the outer rotor and radially protrude from the central axis; and
   two pulsed Hall elements and one linear Hall element that are arranged to oppose the plurality of magnets,
   wherein the two pulsed Hall elements detect switching of magnetic poles caused by movement of the plurality of magnets passing through each vicinity of the two pulsed Hall elements when the outer rotor rotates,
   the one linear Hall element outputs a linear signal representing a linear change of a magnetic flux density caused by movement of the plurality of magnets when the outer rotor rotates, and
   at least one of the magnets is comprised of an offset magnet that is offset along the central axis as compared to the other magnets.

2. The motor according to claim 1, wherein the offset magnet is arranged to be closer to the linear Hall element than the other magnets.

3. The motor according to claim 2, wherein the linear Hall element is offset so as to be separated from the other magnets along the central axis farther than the two pulsed Hall elements.

4. The motor according to claim 1, further comprising a magnetic flux collecting plate between the respective Hall elements and the respective magnets.

5. The motor according to claim 1, wherein at least two of the magnets are comprised of the offset magnets.

6. The motor according to claim 5, wherein each offset amount of the at least two offset magnets along the central axis is different from one another.

7. The motor according to claim 1, further comprising:
   an analysis circuit that analyzes the linear signal representing the linear change of the magnetic flux density,
   wherein, the analysis circuit includes two comparators connected to the one linear Hall element,
   the linear signal representing the linear change of the magnetic flux density and threshold are input to each of the two comparators from the one linear Hall element, and
   the thresholds to be input, respectively, to the two comparators are different from one another.

8. The motor according to claim 7, wherein:
   one of the thresholds to be input, respectively, to the two comparators is a threshold for detection of switching timing of magnetic poles of the plurality of magnets, and
   the other of the thresholds to be input, respectively, to the two comparators is a threshold for detection of a rotation period of the outer rotor.

9. The motor according to claim 8, wherein the threshold for detection of the switching timing of the magnetic poles of the plurality of magnets is smaller than the absolute value of a magnetic flux density caused by the other magnets and smaller than the absolute value of a magnetic flux density caused by the offset magnet, and
   the threshold for detection of the rotation period of the outer rotor is larger than the absolute value of the magnetic flux density caused by the other magnets and smaller than the absolute value of the magnetic flux density caused by the offset magnet.

10. A motor comprising:
    a cylindrical outer rotor that is rotatable around a central axis thereof;
    a plurality of magnets that are arranged at equal intervals on an inner circumferential surface of the outer rotor;
    a plurality of stators that are housed inside the outer rotor and radially protrude from the central axis; and
    two pulsed Hall elements and one linear Hall element arranged to oppose the plurality of magnets,
    wherein the two pulsed Hall elements detect switching of magnetic poles caused by movement of the plurality of magnets passing through each vicinity of the two pulsed Hall elements when the outer rotor rotates,
    the one linear Hall element outputs a linear signal representing a linear change of a magnetic flux density caused by movement of the plurality of magnets when the outer rotor rotates, and
    an absolute value of a magnetic force of at least one of the magnets is set to be larger than an absolute value of each magnetic force of the other magnets.

11. The motor according to claim 10, further comprising an analysis circuit that analyzes the linear signal representing the linear change of the magnetic flux density wherein,
    the analysis circuit includes two comparators which are connected to the one linear Hall element,
    the linear signal representing the linear change of the magnetic flux density and threshold are input to each of the two comparators from the one linear Hall element, and
    the thresholds to be input, respectively, to the two comparators are different from one another.

12. The motor according to claim 11, wherein one of the thresholds to be input, respectively, to the two comparators is a threshold for detection of switching timing of magnetic poles of the plurality of magnets, and the other of the thresholds to be input, respectively, to the two comparators is a threshold for detection of a rotation period of the outer rotor.

13. A method of detecting a rotation period of a motor which includes a cylindrical outer rotor that is rotatable around a central axis thereof, a plurality of magnets that are arranged at equal intervals on an inner circumferential surface of the outer rotor, a plurality of stators that are housed inside the outer rotor and radially protrude from the central axis, and two pulsed Hall elements and one linear Hall element that are arranged to oppose the plurality of magnets, and in which the two pulsed Hall elements detect switching of magnetic poles caused by movement of the plurality of magnets when the outer rotor rotates, the one linear Hall element outputs a linear signal representing a linear change of a magnetic flux density caused by movement of the plurality of magnets when the outer rotor rotates, and at least one of the magnets is comprised of an offset magnet which is arranged offset along the central axis as compared to the other magnets, the method comprising:
    analyzing the linear signal representing the linear change of the magnetic flux density using two thresholds.

14. A sensor assembly applied to a motor which includes a cylindrical outer rotor that is rotatable around a central axis thereof, a plurality of magnets that are arranged at equal intervals on an inner circumferential surface of the outer rotor, and a plurality of stators that are housed inside the outer rotor and radially protrude from the central axis, and in which at least one of the magnets is comprised of an offset magnet which is arranged offset along the central axis as compared to the other magnets, the sensor assembly comprising:
- two pulsed Hall elements and one linear Hall element arranged to oppose the plurality of magnets; and
- an analysis circuit that includes two comparators,
- wherein the two pulsed Hall elements detect switching of magnetic poles caused by movement of the plurality of magnets when the outer rotor rotates,
- the one linear Hall element outputs a linear signal representing a linear change of a magnetic flux density caused by movement of the plurality of magnets when the outer rotor rotates,
- the two comparators are connected to the one linear Hall element,
- the linear signal representing the linear change of the magnetic flux density and a threshold are input to each of the two comparators from the one linear Hall element,
- the respective thresholds input to the respective comparators are different from one another, and
- the analysis circuit analyzes the linear signal representing the linear change of the magnetic flux density using the respective thresholds.

15. The sensor assembly according to claim 14, wherein the linear Hall element is offset so as to be closer to the offset magnet along the central axis than the two pulsed Hall elements.

16. The sensor assembly according to claim 14, wherein a magnetic flux collecting plate is arranged between the respective Hall elements and the respective magnets.

17. The sensor assembly according to claim 14, wherein:
- one of the thresholds to be input, respectively, to the two comparators is a threshold for detection of switching timing of magnetic poles of the plurality of magnets, and
- the other of the thresholds to be input, respectively, to the two comparators is a threshold for detection of a rotation period of the outer rotor.

18. A power generator comprising:
- a cylindrical outer rotor that is rotatable around a central axis thereof;
- a plurality of magnets that are arranged at equal intervals on an inner circumferential surface of the outer rotor;
- a plurality of stators that are housed inside the outer rotor and radially protrude from the central axis; and
- two pulsed Hall elements and one linear Hall element arranged to oppose the plurality of magnets,
- wherein the two pulsed Hall elements detect switching of magnetic poles caused by movement of the plurality of magnets passing through each vicinity of the Hall elements when the outer rotor rotates,
- the one linear Hall element outputs a linear signal representing a linear change of a magnetic flux density caused by movement of the plurality of magnets when the outer rotor rotates, and
- at least one of the magnets is comprised of an offset magnet that is arranged offset along the central axis as compared to the other magnets.

19. The power generator according to claim 18, further comprising an analysis circuit that analyzes the linear signal representing the linear change of the magnetic flux density
- wherein, the analysis circuit includes two comparators which are connected to the one linear Hall element,
- the linear signal representing the linear change of the magnetic flux density and threshold are input to each of the two comparators from the one linear Hall element, and
- the thresholds to be input, respectively, to the two comparators are different from one another.

20. The power generator according to claim 19, wherein:
- one of the thresholds to be input, respectively, to the two comparators is a threshold for detection of switching timing of magnetic poles of the plurality of magnets, and
- the other of the thresholds to be input, respectively, to the two comparators is a threshold for detection of a rotation period of the outer rotor.

* * * * *